March 6, 1951
P. L. CIACCIO
2,544,256
REELING, ROTATING, AND DRIVING
UNIT FOR SEWER CLEANING RODS
Filed Dec. 20, 1947
2 Sheets-Sheet 1
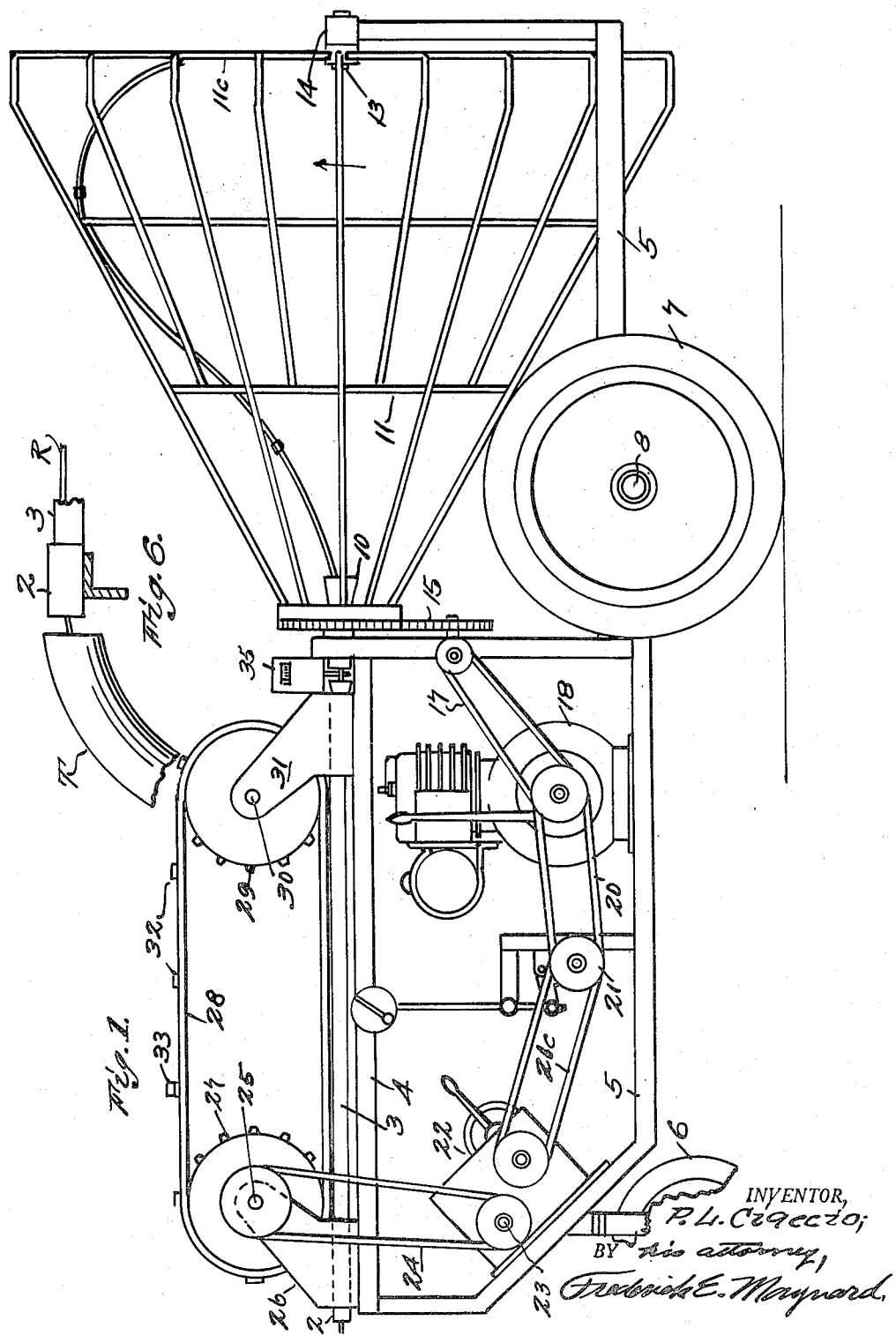

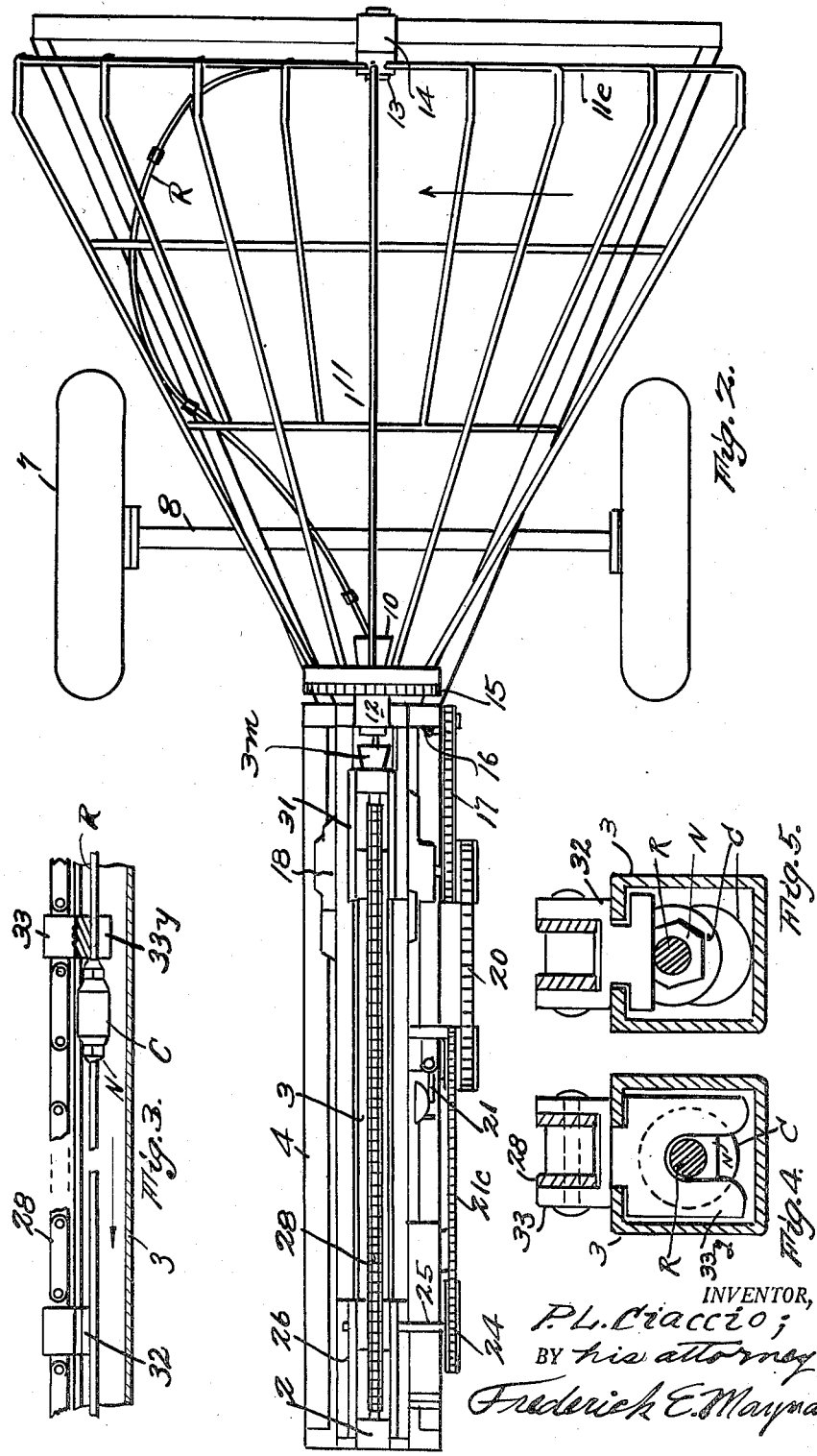

Patented Mar. 6, 1951

2,544,256

UNITED STATES PATENT OFFICE 2,544,256

REELING, ROTATING, AND DRIVING UNIT FOR SEWER CLEANING RODS

Peter L. Ciaccio, Los Angeles, Calif., assignor to Flexible Sewer Rod Equipment Company, Los Angeles, Calif., a copartnership Application December 20, 1947, Serial No. 792,970

8 Claims. (Cl. 15—104.3)

This invention is a self-contained trailer unit provided with powered means for handling flexible, steel, sewer cleaning rods with couplers of the type shown in Crane Patent No. 2,152,636.

Such rods are commonly pushed into and pulled from a pipe line to be cleaned by a small, special tractor which also rotates the rod; the speed of travel of the tractor being varied to change the rate of advance of the working rod into a pipe. The length of rod being used is led to or from the tractor by manual labor attending a suitable reel distally located as to the tractor.

It is a purpose of this invention to provide a substantial, practical, reliable apparatus embodied in the form of a trailer vehicle and which incorporates mechanism, including a power plant, in which a great length of coupled rod sections is carried and can be fed out or reeled back into the machine for stored, bodily transportation from shop to job, or job to job, means being provided for reeling or unreeling at will without manual attention.

Further, an intent of the invention is to provide a power driven reel whereby the relative cleaning rod (meaning herein a long length of made up sections) can be constantly rotated both while being payed out to a pipe being cleaned, or is being retracted back into the reel.

Also, the invention has the object of power feeding the rod into or pulling it from a pipe, or other conduit, without travel of the trailer unit per se; thus to provide for the close up disposition of the outlet collar of the unit as to a manhole rod guide tube.

The invention aims to provide a rod handling and feeding means which will have capacity for running bent rods, and will carry, and rotate and drive, axially, a rod length of as much as one thousand feet, and store the same; thereby eliminating the need of an extra reel and carrier.

The invention resides in certain advancements in this art as set forth in the ensuing disclosure and having, with the above, additional objects and advantages as hereinafter developed, and whose constructions, combinations and details of means will be made manifest in the following description of the herewith illustrative embodiment and its manner of operation; it being understood that modifications, variations and adaptations may be resorted to within the scope, spirit and principles of the invention as it is claimed in conclusion hereof.

Figure 1 is a left-hand side elevation of the trailer machine; the front swivel wheel being broken away.

Figure 2 is a plan view of the machine.

Figure 3 is a detail elevational view showing a chain pusher link in rod driving (advancing) position.

Figure 4 is a transverse section of the rod guide channel with a pusher link astraddle a rod in the channel, and Figure 5 is a similar section showing a chain check link holding down the flexible rod against undue lash.

Figure 6 is a detail showing the rod mouth set close to a manhole rod guide tube.

Several rod sections R are severally joined end to end by a coupler C which has at its ends lock nuts N, which are commonly of reverse pitch. In pipe cleaning a suitable tool is attached to the lead end of this rod and is entered into the pipe. In best practice a curved rod tube T, Fig. 6, is used, as at a manhole, to safely guide the rod into a sewer pipe, for instance.

A feature of this invention is that the new unit can be set very close to the top mouth of such a guide tube and the rod passed substantially unexposed and directly confined and controlled at the juxtaposition of the guide tube mouth and a throat piece 2 of the instant machine. This throat 2 is at the end of an elongate channel 3 rigidly fixed on a horizontal bed 4 forming a part of a vehicle frame 5 whose front end is mounted on a swivel wheel 6, Fig. 1.

The rear end of the frame is mounted on twin road wheels 7 on an axle 8.

The channel 3 is open at its top, Figs. 4 and 5, and its rear end has a bell-mouth 3m disposed close to a horizontal funnel 10 which flares coaxially into the smaller end of a large, conical cage 11, preferably having a sheet-metal housing guard which is omitted for clarity of the cage. The cage flares from the funnel, which is journalled in a bearing 12, and its far end has a short stud trunnion 13 turning in a fixed bearing 14 on the end of the frame 5. The cage is internally unobstructed so that the rod R which passes in and out of the funnel can whip freely as the rod is drawn from the cage or is axially forced into the cage where the rod will automatically lay itself in coils of large diameter on the end bars 11e of the cage.

In the operation of the machine to axially advance or to pull back the rod the reeling cage is rotated preferably at a constant speed by means of a sprocket transmission 15 geared at 16 to a sprocket transmission 17 taking power from a suitable prime mover 18, in this case a combustion engine. It is clear that when the cage is rotated all that portion of the rod R extended to and from the channel and its throat 2 will be rotated—and thereby rotate the rod tool in the pipe bore being cleaned.

Means are provided for the positive drive and positive pull of the rod at will while the rod rotating cage is in operation; the word drive herein meaning axial movement of the rod. To that end, a sprocket transmission 20 runs from the motor 18 to a suitable type of variable speed mechanism 21; a V-belt type is preferred. This transmission 21 is connected by a chain 21c to a suitable reversing gear means 22 whose countershaft 23 drives a transmission chain 24 driving cross-shaft 25, mounted in bearings 26 on the bed 4, and having fixed thereon a sprocket wheel 27 disposed just above the rod channel 3.

The wheel 27 drives a sprocket chain 28 which is in a vertical plane and runs over a rear, idler sprocket wheel 29 having a shaft 30 turning in bearings 31 fixed on the said bed.

Fixed at suitable intervals along the chain 28 is a series of check links with fixed blocks 32 depending into the channel to a sufficient degree to prevent undue bowing of the rod R out of the channel 3 as the rod is worked in either direction along the channel 3; note Fig. 5.

Also fixed at suitable spacings along the chain 28 are links with fixed pusher blocks 33 which have bottom yokes 33y to closely straddle a rod in the channel 3 and as the drive chain 28 rotates in either direction these pushers will engage the end faces of the nuts N, according to direction of travel of the bottom stretch of the chain 28 moving just above the top of the rod guiding channel. When the rod is being pushed out through the throat 2 the right hand rotation of the cage and of the issuing rod will cause the nuts N then engaged by adjacent pushers 33 to tend to tighten or screw in the left thread nuts on the right hand end of its relative coupler C. When the direction of drive of the chain 28 is reversed, to pull the rod back into the rotating cage, the pushers then also tend to screw in the engaged nut on the left hand end of the relative coupler; this nut being right-hand thread.

It will be seen that by means of the variable speed mechanism 21 the driving chain 28 can be operated at one or another speed as determined by the kind of tool being used, and the degree of work resistance, and the rod can be rapidly pulled from a hole or pipe bore when this has been worked clean, or when the tool cannot be driven farther into the bore. At the beginning of a cleaning job the great length of rod R is bedded, in the large end of the cage 11, as a coil and as the drive chain operates to advance the tool end of the rod from the throat 2 the rod uncoils and passes into the channel 3 to be engaged by the pushers 33 and hold-down or check blocks 32. When the rod is being pulled from a bore hole the rod again stores itself in a large coil in the rotating, reeling cage 11.

An accurate count of the extended rod is made by means of a suitable counting device 35 actuated by each coupler C passing out from the cage.

In Fig. 6 the throat 2 is shown as juxtaposed close to the top end of a manhole, rod guiding tube T, to prevent undesired whip of the rod passing to and from the guide tube.

What is claimed is:

1. A flexible, coupled-section rod handling machine having, in combination, a rotative cage having an axial outlet throat for passage of the rod and a power drive means which is fixed against bodily rotation and includes a travelling belt with pushers to continuously and respectively engage with couplers of an extended portion of the relatively rotating rod for continuously pushing the rod from or into the cage, and said belt having rod guide means juxtaposed close to said drive belt and adapted to confine said couplings and restrain lateral motion thereof and thus prevent whip of the rod passing from or to the cage.

2. The machine of claim 1; said rod guide means including rod straddling yoke parts fixed to the belt to freely turnably engage shoulders along the rod while it rotates and thereby to push or pull it.

3. A portable, flexible rod handling unit including a frame, a rod reeling cage and means to rotate the cage and thereby the rod, travelling belt drive means for pulling or pushing a relatively rotating portion of the rod extended axially from the cage and means to vary the speed of the drive means, stationary bearings for said belt drive means, means to reverse the motion of the drive means, guide means to prevent undesired lateral dislodgement of the drive means from the engaged portion of the rod, and a prime mover for all of the said means; all being mounted on the frame to facilitate transportation as a unit for use of the rod in cleaning a bore hole.

4. A machine for handling sectional, coupler connected sewer rods, having a conical, rod reeling cage having an axial guide funnel for the rod, a fixed channel for rod passing to or from the funnel, a bodily non-rotative driving means having a travelling chain belt to engage and push or pull the rod in the channel, and means to rotate the cage and thereby the rod with respect to the non-rotative drive means.

5. The machine of claim 4; said chain having pusher devices adapted to engage coupler shoulders of the relatively rotative rod for both pushing out or pulling in actions of the rod.

6. The machine of claim 5; and hold-down, check means on the chain and longitudinally running in the chamber of the channel to engage and prevent undesired bowing of the relatively rotating rod.

7. The machine of claim 4; said chain having fixed thereon a series of spaced yokes adapted to straddle the rod and to rotatively engage contiguous couplings assembled in the rod.

8. A wheeled trailer vehicle for transporting and functionally handling a flexible, sewer-cleaning-tool working rod, including a horizontally disposed conical cage having a rod funnel at its smaller end and a rod coil bed at its opposite end, a frame on which the cage is rotatively supported and means on the frame to rotate the cage, and thereby the rod, a fixed rod receiving channel extending axially away from said funnel, and reversible motion chain means having abutment parts working in the channel to push the relatively rotary rod while at work or to restore the rod to the cage.

PETER L. CIACCIO.

REFERENCES CITED

The following references are of record in the file of this patent:

UNITED STATES PATENTS

| Number | Name | Date |
|---|---|---|
| 514,195 | Kingsland et al. | Feb. 6, 1894 |
| 942,257 | Hansen et al. | Dec. 7, 1909 |
| 1,251,152 | Wilkins | Dec. 25, 1917 |
| 1,962,466 | Scott et al. | June 12, 1934 |
| 1,982,184 | Williams et al. | Nov. 27, 1934 |
| 2,005,936 | Crane | June 25, 1935 |
| 2,033,816 | Rivett-Carnak | Mar. 10, 1936 |
| 2,210,300 | Magruder | Aug. 6, 1940 |
| 2,282,600 | Blanc | May 12, 1942 |
| 2,383,843 | Blanc | Aug. 28, 1945 |